US 6,424,745 B1

(12) United States Patent
Hansen et al.

(10) Patent No.: US 6,424,745 B1
(45) Date of Patent: Jul. 23, 2002

(54) METHOD AND APPARATUS FOR OBJECT RECOGNITION

(75) Inventors: Mark Henry Hansen, Hoboken, NJ (US); Harald F. Hess, San Diego, CA (US); Partha Pratim Mitra, Jersey City; Gordon Albert Thomas, Princeton, both of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/081,469

(22) Filed: May 19, 1998

(51) Int. Cl.[7] .................................................. G06K 9/46
(52) U.S. Cl. ...................... 382/191; 382/110; 382/154; 382/165; 356/601; 250/559.19
(58) Field of Search ........................ 382/110, 164–165, 382/170, 190, 191, 154; 209/580, 939; 250/226; 348/89; 356/407, 601

(56) References Cited

U.S. PATENT DOCUMENTS

| | | | | |
|---|---|---|---|---|
| 4,873,651 A | * | 10/1989 | Raviv .......................... | 700/259 |
| 5,060,290 A | * | 10/1991 | Kelly et al. .................. | 382/165 |
| 5,085,325 A | * | 2/1992 | James et al. ................. | 209/580 |
| 5,164,795 A | * | 11/1992 | Conway ...................... | 356/407 |
| 5,546,475 A | * | 8/1996 | Bolle et al. .................. | 382/190 |
| 5,548,405 A | * | 8/1996 | Motosugi ..................... | 356/601 |
| 5,729,704 A | * | 3/1998 | Stone et al. ................. | 345/804 |

* cited by examiner

Primary Examiner—Jose L. Couso
Assistant Examiner—Gregory Desire
(74) Attorney, Agent, or Firm—Gibbons, Del Deo, Dolan, Griffinger & Vecchione (57) ABSTRACT

A method and system for optically recognizing an object from a reference library of known products based on a spectrum of local radius of curvature of the object. A surface portion of an object is illuminated with a pattern of light that permits the extraction of three dimensional coordinates for a set of points on the surface portion of the object. An image data set of the surface portion of the object is then captured with a capture device that is positioned at an angular offset with respect to a source of the light. That is, the combination of the light pattern and the imaging device together generate a two dimensional captured image, from which it is possible to extract the three dimensional coordinates for the set of points on the surface portion of the object. A set of local radii of curvatures are then determined for selected data points in the image data set. A spectrum representing a distribution of the curvatures is then computed for the set of local radii of curvatures. If the data set is for the generation of a library of spectra, it is processed with a dimension reduction analysis to determine a single set of basis functions representing all of the objects and a corresponding set of basis coefficients for each different type of object. If the data set is for an unknown object, then the dimension reduction analysis and the basis functions are applied to the data set to generate an unidentified set of basis coefficients. This latter set is then statistically compared with the reference library of spectra to identify the product or at least designate the closest known products.

31 Claims, 5 Drawing Sheets

METHOD AND APPARATUS FOR OBJECT RECOGNITION

FIELD OF THE INVENTION

The present invention relates to the field of optical object recognition, and more particularly to the use of local radii of curvatures to identify products and materials.

BACKGROUND OF THE INVENTION

Bar-code readers are used extensively in the retail grocery industry at checkout stations to identify tagged items affixed with bar-code tags. An item is identified by means of its bar-code using a data base stored in a host computer. Typically, a description of the item and its price are printed on a grocery receipt and an ongoing price total is kept as additional items are scanned. The use of bar-code readers has generally been well received by the public, due in part, to the reliability and reduced time spent in the checkout line. However, a reliable system is needed to identify items for which it is undesirable to attach bar-code labels, for example, fresh produce, such as fruits and vegetables.

The use of optical devices to characterize and recognize fresh produce has been explored to some extent in the prior art. Some general considerations involved in the optical identification of these products are discussed in a number of publications, including for example, "Postharvest Handling: A Systems Approach", by R. L. Shewfelt and S. E. Prussia (Academic Press, New York). An example of a particular application of produce recognition is a study by L. Bochereau et al. (J. Agric. Eng. Res. (1992) Vol. 51, 207–216) showing that near infrared spectra can be used to determine the quality of golden delicious apples, provided that a careful neural-network analysis is performed in the wavelength range from 1,000 to 1,500 nm.

Specifically, a number of devices are disclosed in the prior art for recognizing products using image processing techniques. For example, U.S. Pat. No. 5,546,475 issued to Bolle et al. and assigned to IBM Corp., discloses a device that uses image processing to recognize objects within a scene. The prior art image processing device takes a first image at a high illumination level and a second image at a lower illumination level by using a controlled illumination source. A segmentation routine separates the background image from the object image by comparing the two images. Feature extraction is performed on the processed image and compared against stored reference images. In one embodiment, shape is used as a recognition feature, where local boundary curvatures are used for the shape measurements.

A disadvantage of this prior art device is that direct curvature information is not available since the device illuminates and captures images of the entire object. The curvature information is then derived from the available grey scale information. Since the grey scale information is directly related to the intensity levels captured by the camera, color variations in the objects make it difficult to determine accurate and consistent curvature information. A further drawback is that the intensity is also affected by the orientation of the object. As a result, an object recognition system is required that is independent of the varying characteristics of the object.

SUMMARY OF THE INVENTION

The present invention is a method and a system that increases the accuracy and reliability of object recognition by analyzing distributions of local radii of curvatures to determine the unknown object. The system provides optical recognition of products that do not readily lend themselves to standard labeling techniques. Importantly, the system can be employed with, and is integratable with, retail checkout systems which use bar code reader technology. The resulting combination provides a system which processes both labeled and non-labeled products reliably and accurately.

In an exemplary embodiment of the present invention, a surface portion of an object is illuminated with a pattern of light that permits the extraction of three dimensional coordinates for a set of points on the surface portion of the object. An image data set of the surface portion of the object is then captured with a capture device that is positioned at an angular offset with respect to a source of the light. That is, the combination of the light pattern and the imaging device together generate a two dimensional captured image, from which it is possible to extract the three dimensional coordinates for the set of points on the surface portion of the object. An exemplary embodiment of such a light pattern may consist of a series of separately identifiable arcs projected on the surface portion of the object. A set of local radii of curvatures are then determined for a set of selected data points in the image data set. A spectrum representing a distribution of the curvatures is then computed for the set of local radii of curvatures. If the image data set is for the generation of a library of spectra, it is processed with other spectra of curvatures to form a reference library of known objects. If the image data set is for an unknown object, then it is compared against the reference library of known objects to make an identification.

Advantageously, the method of the present invention provides three-dimensional curvature measurements because the angle between the light source and the capture device has the effect of making the reflected patterned light look curved. Moreover, the method is independent of object variations and object orientation since the library of spectra generally includes curvature distributions reflecting potential orientations of the objects. The amount of computer memory required is not significantly increased because basis functions and basis coefficients permit low dimensional representation and expansion of the spectra. Importantly, the present invention has to maintain only a fraction of the original data to make the required identification.

The above factors make the present invention product identifier an advantageous and practical solution for use at supermarket checkout counters to identify fresh produce, such as fruits and vegetables, which are not readily identifiable with a bar-code label. Moreover, the product to be identified could be sitting on a scale and its weight could be measured during the identification process. In a similar manner to grocery items containing bar-code labels, the name and price of the item would be printed on a grocery receipt using the item identification, along with the weight and the price per pound which had been previously stored.

BRIEF DESCRIPTION OF THE FIGURES

For a better understanding of the present invention, reference may be had to the following description of exemplary embodiments thereof, considered in conjunction with the accompanying drawings, in which.

DETAILED DESCRIPTION OF THE DRAWINGS

For clarity of explanation, the illustrative embodiment of the present invention is presented as comprising individual functional blocks (including functional blocks labeled as "controllers" and "processors"). The functions these blocks represent may be provided through the use of either shared or dedicated hardware, including, but not limited to, hardware capable of executing software. For example the functions of processors and controllers presented in FIGS. 1–2 may be provided by a single shared processor. (Use of the term "controller" or "processor" should not be construed to refer exclusively to hardware capable of executing software.)

Illustrative embodiments may comprise microprocessor and/or digital signal processor ("DSP") hardware, read-only memory ("ROM") for storing software performing the operations discussed below, and random access memory ("RAM") for storing results. Very large scale integration ("VLSI") hardware embodiments, as well as custom VLSI circuitry in combination with a general purpose DSP circuit, may also be provided.

As is known, grocery products having bar-coded labels may be scanned at a bar-code reader to identify the product. In most cases, a description of the recognized item and its previously stored price are displayed, printed and automatically tabulated as part of a customer's grocery bill. In the case of grocery items which do not lend themselves to bar-code labeling, such as fresh produce, an alternative methodology is needed to automatically identify an item or items and record the price.

As shown below, the present invention provides a practical solution for use at supermarket checkout counters to identify fresh produce, such as fruits and vegetables, which are not readily identifiable with a bar-code label. Moreover, the product to be identified could be sitting on a scale and its weight could be measured during the identification process. In a similar manner to grocery items containing bar-code labels, the name and price of the item would be printed on a grocery receipt using the item identification, along with the weight and the price per pound which had been previously stored. As such, the present invention can be employed with, and is integratable with, retail checkout systems which use bar code reader technology. The resulting combination provides a system which processes both labeled and non-labeled products reliably and accurately. Although the present invention is discussed, in part, with respect to the identification of produce, it is implementable in any situation where bulk items are sold, for example, hardware stores.

In general, the present invention is a method and a system that accomplishes object recognition by analyzing distributions of local radii of curvatures to identify an unknown object. In accordance with present invention, a pattern of light is applied to a surface portion of an object and a two dimensional image is captured by an imaging device that is positioned at angle with respect to a source of the light. The combination of the patterned light and offset imaging device permits extraction of three dimensional coordinates for a set of data points on the surface portion of the object from the two dimensional captured image.

The method then determines a set of local radii of curvatures for the selected data points in the data set and generates a spectrum representing a distribution of the local radii of curvatures. Specifically, the distributions indicate the mean and Gaussian curvatures for each of the selected data points. During the generation of a reference library of spectra, spectra of multiple objects along with their multiple orientations are compiled. These spectra are then processed with a dimension reduction analysis to determine a single set of basis functions representing all of the objects and a corresponding set of basis coefficients for each different type of object. If the data set is for an unknown object, then the unclassified spectra is expanded in a basis, resulting in a set of coefficients. This latter set is then statistically compared with the reference library of spectra to identify the product or at least designate the closest known products.

Figure 1:
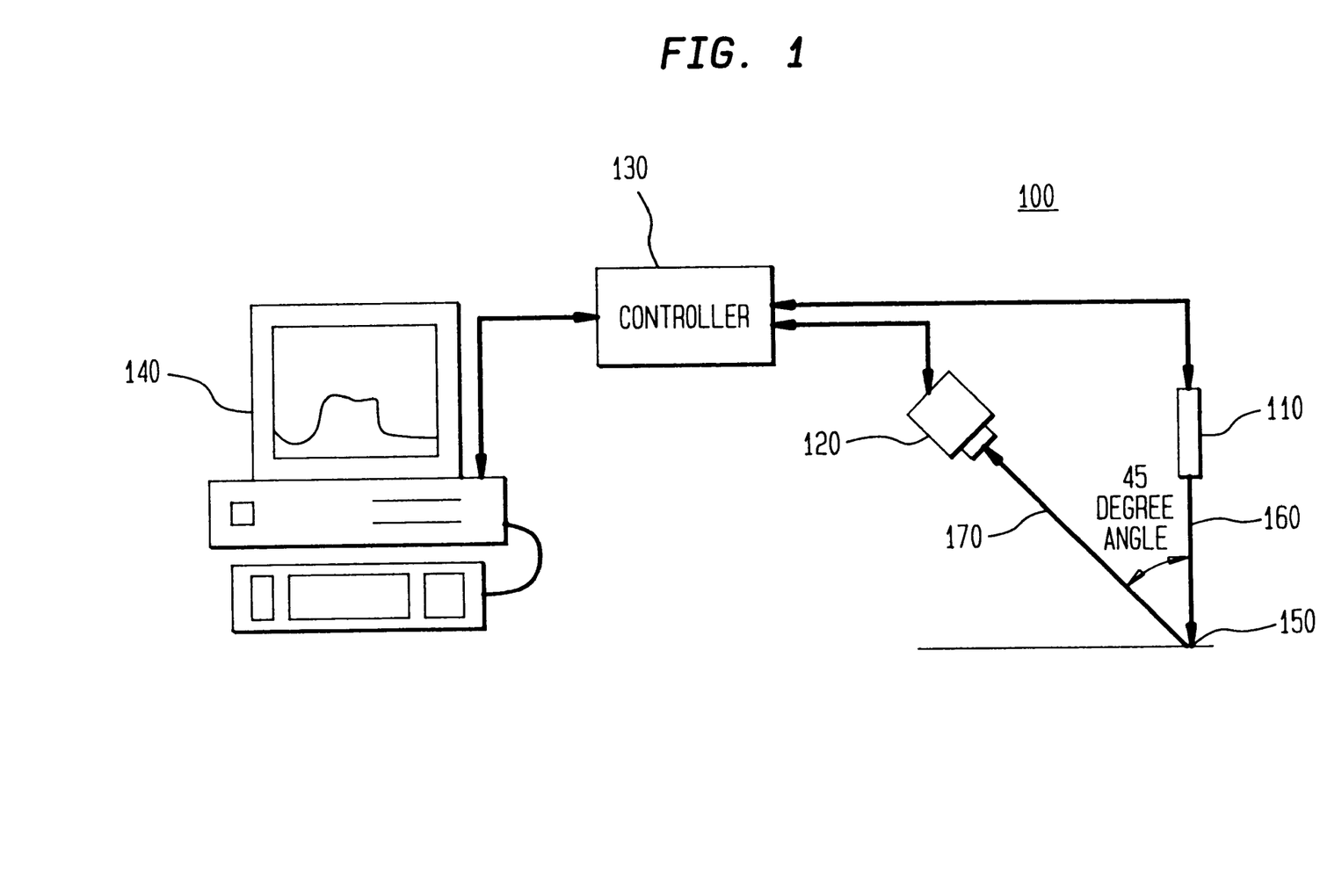
FIG. 1 shows one preferred embodiment of the present invention optical recognition system.

Referring to FIG. 1, there is shown an exemplary embodiment of an object recognition system 100 which utilizes the methods of the present invention to recognize and identify objects utilizing distributions or spectra of local radii of curvatures. Object recognition system 100 includes a source 110 for generating a pattern of light that permits extraction of three dimensional coordinates of object 150. Object recognition system 100 further includes a light capture device 120 that is positioned with respect to source 110 such that the direction of illumination and the direction of image capture are different and separated by a given angle. In; an exemplary embodiment, source 110 and light capture device 120 have an angular offset of 45°. Object recognition system 100 also includes a processor 140 that performs the analysis described below on the image data set received from light capture device 130. A controller 130 is coupled between processor 140 and source 110 and light capture device 120 to control the operation of the latter two devices.

Operationally, a user will place object 150 in an illumination path 160 of source 110. Source 110 then illuminates a spot on object 150 such that the reflected patterned light 170 provides a reasonable picture of the curvature and roughness of object 150. Importantly, object 150 is not completely illuminated by source 110. Complete illumination of object 150 introduces the problem of segmentation into the analysis and more importantly, makes it very difficult to obtain curvature information. The size of the spot or surface portion illuminated by source 110 is nominally related to the size of object 150. Source 110 can be implemented using laser diodes to provide spot illumination. In an exemplary embodiment, controller 130 controls source 110 to vary the size of the beam illuminating object 150. In another embodiment, a standard spot size is selected to correspond to the smallest potential object that is to be identified by object recognition system 100. Alternatively, a range of sizes can be used.

As stated above, the angular offset between source 110 and light capture device 120 has the effect of providing three-dimensional information from a two-dimensional image when light that is transmitted in a first direction, is received in a second direction. For example, if the light is reflected from a flat surface, it will still look like a straight line. However, if the light is reflected from a sphere, then an arc is generated that has a local radius of curvature. In an exemplary embodiment, light capture device 120 is implementable using a simple black and white camera to capture the two-dimensional image. Other devices can be used such as a color camera.

In order to take advantage of the three-dimensional/two-dimensional relationship, source 110 must illuminate object 150 in such a manner that reflected patterned light 170 has a curved appearance, e.g., in the form of arcs. The pattern of light captured by light capture device 120 should permit extraction of three dimensional coordinates from the two dimensional image. This is achievable by illuminating object 150 with for example, a set of parallel light planes extending in a vertical direction, in a horizontal direction, in a diagonal direction, with a series of "x"s or with a grid type pattern. The number of lines or marks in either implementation is a trade-off between the level of accuracy required and in the amount of time required to complete the entire analysis for the selected number of lines. In an exemplary embodiment, the number of lines is nominally between 5 and 10. The size of the lines would, of course, be controlled by the illumination spot size. After illuminating object 150 in the manner described above, light capture device 120 captures an image of the spot in question. As described below, processor 140 then generates local radii of curvatures corresponding to the selected data points in the image, where the selected data points are either inherently provided by the light pattern (i.e., the grid) or are interpolated by processor 140 using interpolation techniques (i.e., for the set of parallel lines).

Figure 2:
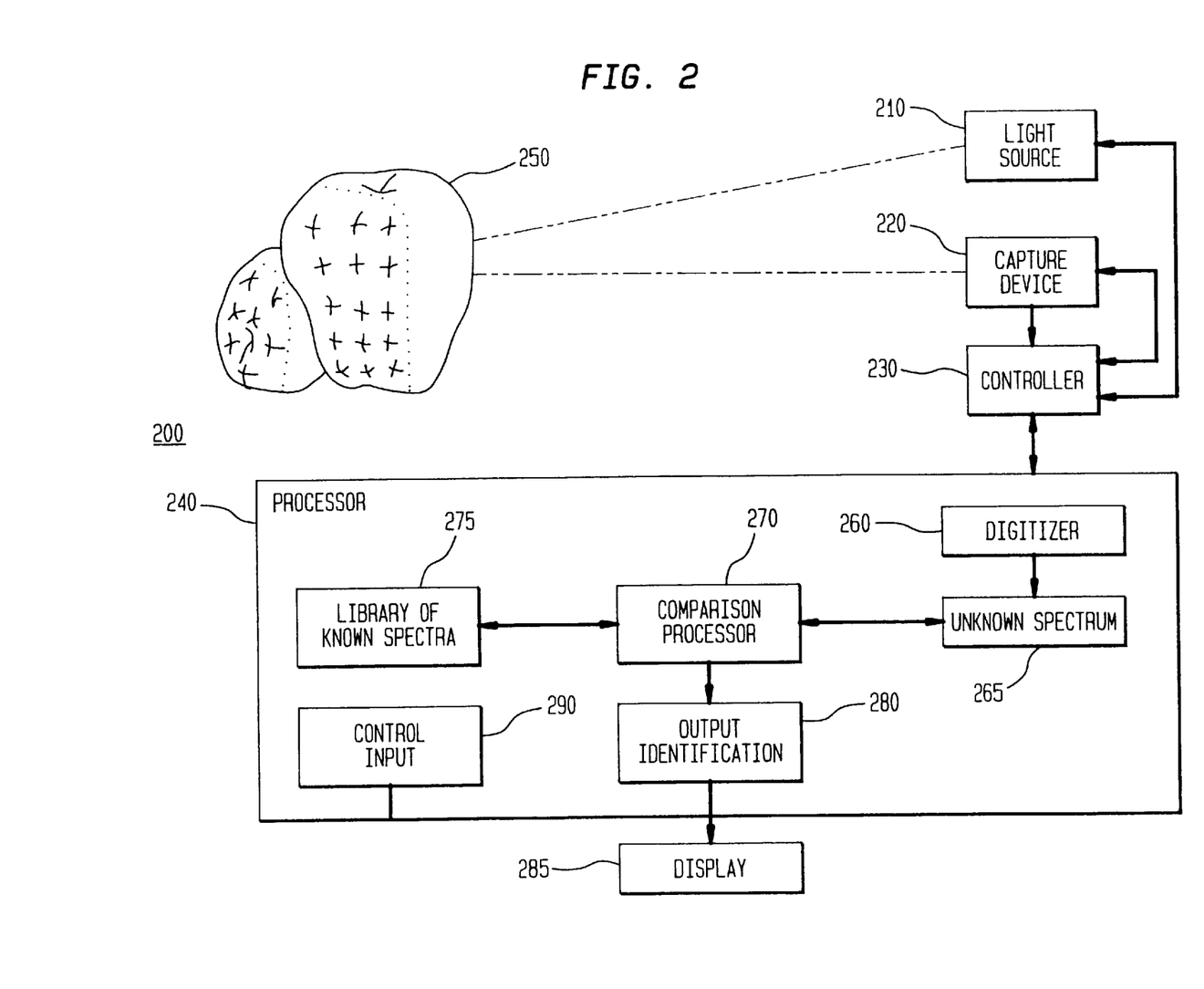
FIG. 2 shows a block diagram for one preferred embodiment of the present invention optical recognition system.

Referring now to FIG. 2, a block diagram 200 is presented of object recognition system 100. For purposes of clarity, a top level functional overview of what takes place within processor 140 for identifying an unknown object is presented first, followed by a more detailed explanation of the present invention methodology. As can be seen, source 210 outputs a pattern of light onto a spot on unknown object 250. A light capture device 220 captures an image of the patterned light reflected from object 250 and forwards an electronic representation of the unknown image data set to processor 240. In one embodiment, the unknown image data set is transferred through a controller 230. Specifically, the analog signals from light capture device 220 are first converted to digital signals using a digitizer 260 and then analyzed by processor 240. It will be understood that digitizer 260 can be implemented as an analog-to-digital converter that may be included as part of processor 240 or as part of controller 230.

The unknown image data set sent to processor 240 consists essentially of two dimensional data points representing the surface portion of object 250, from which three dimensional coordinates can be extracted. As described below, processor 240 analyzes a set of selected data points and determines a local radius of curvature for each selected data point. In FIG. 2, selectable data points are represented by "x"s. The resulting local radii of curvatures are then compiled using a smoothed, bivariate (or a transformed version such as log f(x)) histogram to generate an unknown spectrum 265, that represents a distribution of the local radii of curvatures. Sets of known spectra from like identifiable objects determine library of known spectra 275, and the unknown spectrum 265 is compared with the library of known spectra 275 using comparison processor 270. As shown below, the library of known spectra 275 are created from the same type image capture data input to processor 240, but from known objects. For each member of the library 275, an operator uses processor 240 to provide an electronic label such as "Macintosh Apple" and a price per unit weight. The operator then uses processor 240 to group and characterize individual spectrum from the known product into library 275.

In the present invention system, comparison processor 270 compares the unknown spectrum 265 with library of known spectra 50 utilizing statistical techniques. Comparison processor 270 takes into account how much the known spectra for a single item vary from one another in addition to storing the average spectrum. In an exemplary embodiment of this invention, spectra are obtained from multiple orientations of the object with respect to light source 210, for example, a top end, a bottom end, and a side for a piece of fruit. Comparison processor 270 then computes the most likely match for the single unknown spectrum or the set of unknown spectra and also calculates an indicator of the closeness of the match, e.g., a "distance" in a mathematical space or a probability value. Comparison processor 270 may also provide the next most likely possible matches and their probabilities. As can be seen, processor 240 may be coupled to a display device 285, which is in turn coupled to an input device/control input 290, such as a touch screen or keyboard for making operator selections. It will be understood that display 285 and input device 290 may also be part of an existing cash register/checkout system, or alternatively that the system may be automated.

Once the matches have been computed, display 285 (for example, a monitor or a display on the existing cash register) reads out a list of possible matches in rank order that have a probability of match greater than a predetermined threshold, for example, greater than 80% probability. An operator may check that the first listed item is correct and either accept the first choice or indicate the correct choice using input device 290. As an alternative, the system could immediately accept the first choice, as in a fully automatic (unmanned) check-out system with a conveyor belt. As mentioned earlier, in a preferred implementation of the system, the object to be identified would be sitting on a scale and its weight would also be measured as part of the identification process. The scale and optical recognition system 100 can be coupled to the processor 140 or 240 in order to transfer electrical data for processing. As soon as an item identification 280 is made for the object in question, a total price for the identified item(s) can be computed using the weight and a previously stored price/unit figure. In a similar manner, then, to grocery items containing bar-code labels, the name and price of the produce item just identified could be printed on a grocery receipt using the item description, the weight, and the price per pound which was previously stored in the database.

Figure 3:
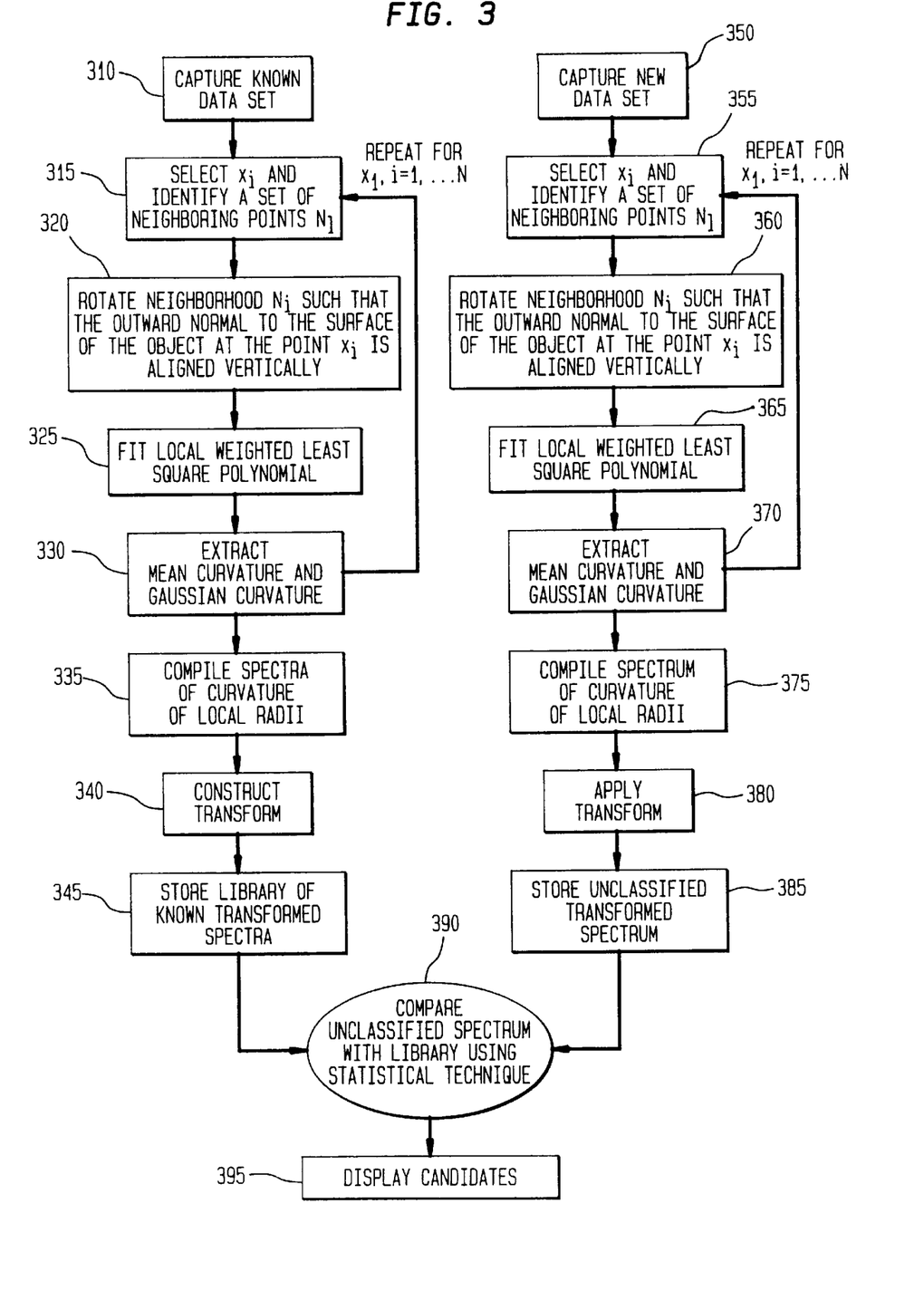
FIG. 3 is a functional flowchart of the methodology of the present invention.

Referring now to FIG. 3, there is presented a more detailed flowchart 300 of the methodology of the present invention. As stated above, a spectrum (in the form of signals) of an unknown object is compared against a library of known spectra. Construction of the library is therefore initially explained, followed by how the unknown spectrum is identified using the library in conjunction with the statistical comparison techniques.

Figure 5A:
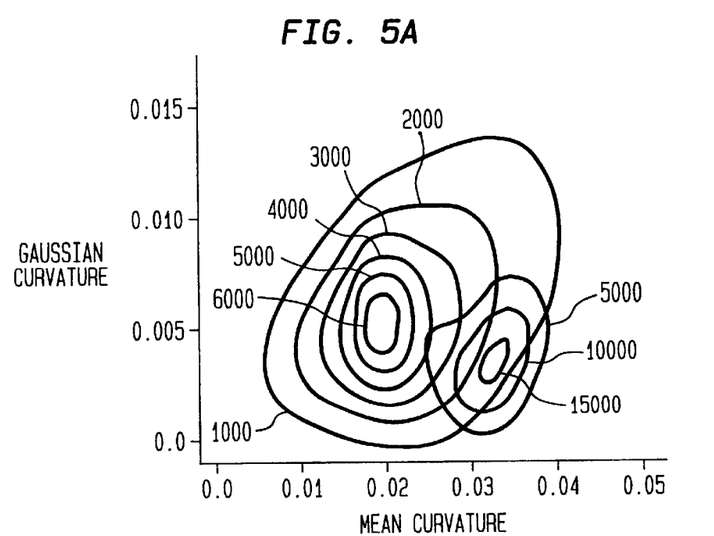
FIGS. 5A–5C show plots of Gaussian curvatures v. mean curvatures for a variety of objects in accordance with the methodology of the present invention.
Figure 5B:
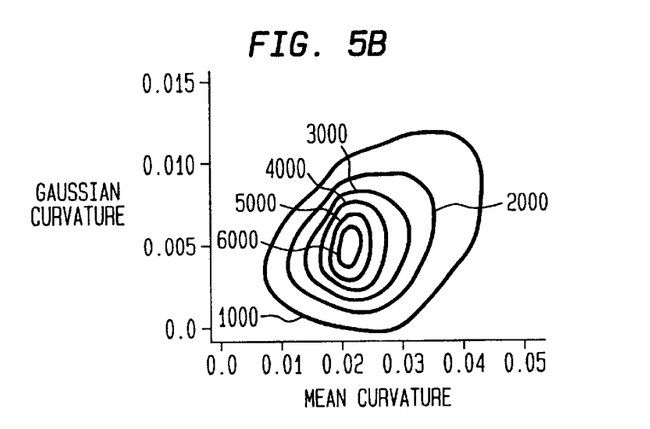
Figure 5C:
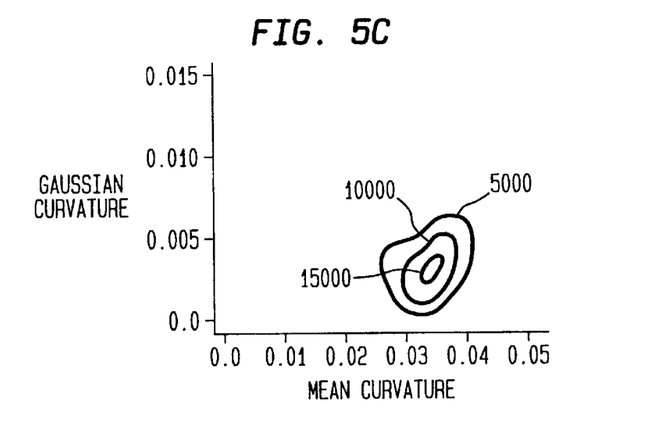

In general, for each piece of fruit scanned (that is, for each view of a single piece of fruit), there is a series of M measurements of the local mean and Gaussian curvature, from which a smoothed bivariate surface is formed (the spectrum shown in FIG. 5).

Initially, a smoothing operation is performed so as to estimate the spectra since the actual data are a series of M points in the mean and Gaussian curvature plane (M pairs of mean and Gaussian curvature values, again see FIG. 5). From this data, a surface is created, the height of which at some point x represents the proportion of our M pairs that are near x (and x=$(x_1\ x_2)$ where $x_1$ is mean curvature and $x_2$ is Gaussian curvature). This is called density estimation, because we are estimating an unknown probability distribution. Alternatively, this can be thought of as smoothing a histogram (where the bars of the histogram represents the proportion or count of the M data points contained in the associated interval).

Now, let $f$ denote one such smooth, bivariate surface. The smooth function $f$ (estimated for a single view of a single piece of fruit) is then compared against a library of spectra. This comparison is aided by approximating for expanding $f$ in a basis $$f(x) \approx \sum_{j=1}^{J} \beta_j B_j(x)$$

where $x=(x_1, x_2)$ and $x_1$ is a mean curvature and $x_2$ is a Gaussian curvature (in some cases these basis functions are employed in the smoothing operation, in which case the approximate symbol becomes an equality in the above equation). This type of expansion or dimension reduction means that we only have to store the coefficient $\beta_1, \ldots, \beta_j$ for each of $f$, and not the whole function. Now, the basis functions themselves are selected either because 1) they allow faithful representation of all the smooth surfaces in the library (that is, each $f$ can be taken and expand as above and obtain get a good approximation) or 2) the expansion gives good classification performance.

If the first approach is taken, linear discriminant analysis ("LDA") is used on the coefficients of the expansions (which is also referred to as the basis coefficients) to derive a good classifier. As shown below, by using LDA, a transformation is obtained which can be applied to the coefficient vectors and permits use of nearest neighbor or non-negative least squares to perform the classification. (In the notation of Appendix A, the d-dimensional vector is just the vector of coefficients ($\beta_1, \ldots, \beta_j$)—implying that d=J). If the latter approach is used, then penalized discriminant analysis ("PDA") is employed to both create the basis functions and determine the coefficients which are ultimately applied with the nearest neighbor classifier or the non-negative least square procedure. (In the notation of the Appendix B, PDA is applied to the functions $f$).

Specifically, image data set 310 represents the three dimensional coordinates of a set of data points on the surface of the object. The method analyzes a set of selected data points, for example, the selected data point can correspond to the "x"s in FIG. 2. These selected data points are then the basis from which the local radii of curvatures are computed. For example, if a 10×10 grid is used as light pattern, there could be 100 data points. As described below, each selected data point conveys curvature information about a subset of data points, where the selected data point is the central data point. This type of analysis conveys information regarding the smoothness or roughness of the object. The method also analyzes groups of selected data points, that is across a specific line, to convey information regarding the size of the object. In sum, the method analyzes the selected data points in various lengths. For each length of selected data points analyzed, a local radius of curvature is generated. These multiple curvatures are then compiled via a smoothed histogram to produce a spectrum representing a distribution of the local radii of curvatures.

Specifically, a number M of data points is selected from image data set 310. For each point $x_i=1, \ldots, M$, the method identifies a set of neighboring points $N_i$. This is the set of all points within a given distance d of $x_i$ (step 315). For example, the number of points may represent 5–10% of the available data points. In equation form this is stated as:

$$N_i = \{x_i : \|x_i - x\| \leq d\}$$

The selected neighborhood $N_i$ is rotated so that the outward normal to the surface of the object at the point $x_i$ is aligned vertically (step 320). This requires estimating the outward normal empirically using a local eigenvector expansion or more deterministically using the pattern of the light. For each point $x \in N_i$, the method applies a linear transform $A_i(x-x_i)$, for some rotation matrix $A_i$ (which is dependent upon point in question). Note that the neighborhood is centered so that $x_i$ is at the origin.

The method then fits a local weighted least square polynomial to the translated and rotated neighborhood data (step 325). Assume that x* denotes the transformed points and that set x=(x, y, z). Then, the method attempts to fit the height z to a quadratic function in x and y. That is, a, b, c, d, e and f are found to minimize $$\Sigma_{x^* \in N_i} w(x^*)(z-(a+bx+cy+dxy+ex^2+fy^2))^2$$

where $$w(x^2) = (1-(\|x^2\|/d)^3)^3$$

is the tri-cube weight function. This function gives more weight to data points near the origin (or near $x_i$, since the neighborhood was translated above).

From the above fitted quadratic, two measures of local radius of curvature are extracted, namely, mean curvature and Gaussian curvature (step 330). The mean curvature is equal to 2*(e+f) and conveys information regarding the size of the object. The Gaussian curvature is equal to 4*(e*f)−d² and conveys information regarding the existence of saddle points in an object, such as a cucumber. Although a number of statistics can be extracted, the above two curvature measures are used in the exemplary embodiment of the present invention.

Figure 4A:
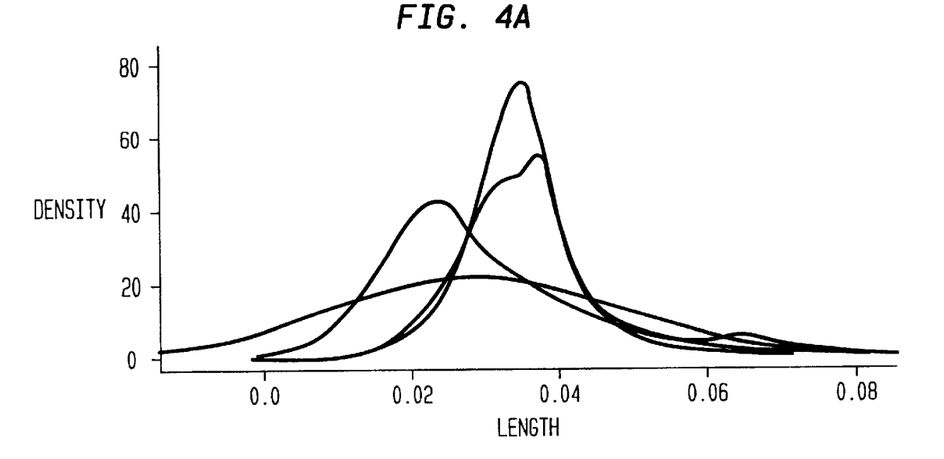
FIGS. 4A–4E show plots of mean curvatures for a variety of objects in accordance with the methodology of the present invention.
Figure 4B:
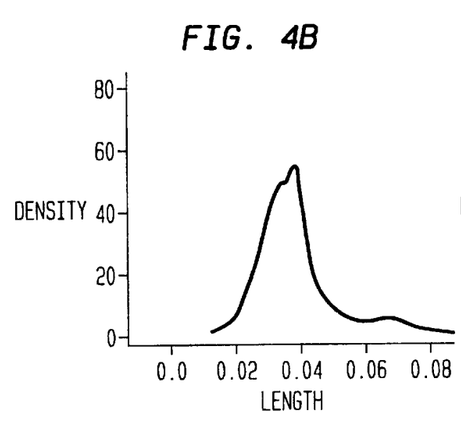
Figure 4C:
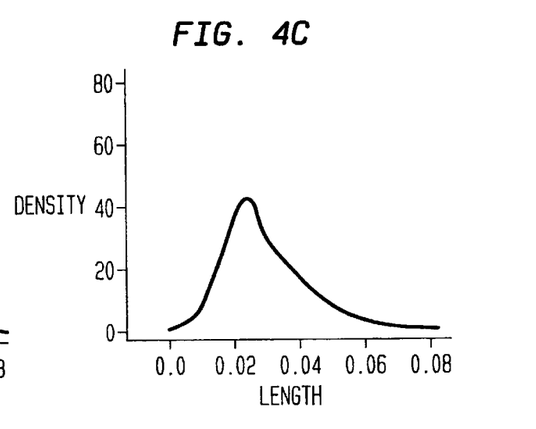
Figure 4D:
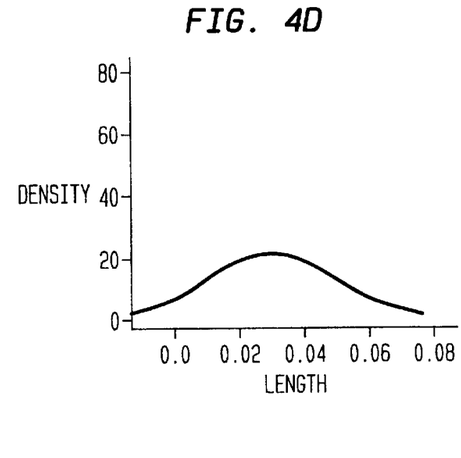
Figure 4E:
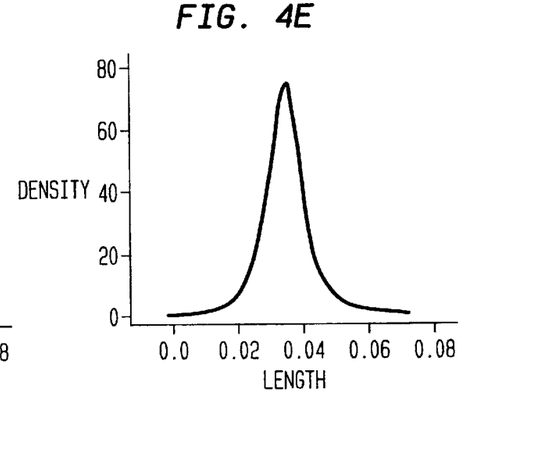

Steps 315 through 330 are repeated for all $x_i=1, \ldots, N$, to establish a population of the two statistics. Once the mean and Gaussian curvatures have been extracted for each of the selected data points, smoothed, bivariate densities describing the mean and Gaussian curvatures are generated from an initial set of histograms (step 335). That is, a spectrum representing a distribution of the local radii of curvatures for the object are produced. Steps 310 through 335 are repeated for each object that is to be recognized by the system and moreover, curvature information is determined for multiple orientations of each object. This ensures that the present invention is independent of object orientation. FIGS. 4A–4E show spectra of mean curvature for a lemon, avocado, apple and orange. Specifically, FIG. 4A shows how the spectra differ for each different type of produce. FIGS. 5A–5C show spectra of Gaussian curvature v. mean curvature for an avocado and orange, respectively. FIG. 5A shows the differences between the two noted produce.

The method of the present invention then derives a set of basis functions from the compiled set of spectra (step 340). In alternate embodiments of the present invention, the basis function analysis is performed on the mean curvature distribution, the Gaussian curvature distribution, on the joint distribution or a transformed version thereof. The number of basis functions generated is based on the desired accuracy of classification. Importantly, once the set of basis functions has been generated, it is the same for all categories of products. Corresponding to the set of basis functions is a set of basis coefficients, where a particular set of basis coefficients together with the basis functions represents one orientation of a specific object. Thus the present invention needs to store only a given number of basis functions for all object categories and a corresponding set of basis coefficients for each measured object orientation. This greatly reduces the memory requirements of recognition system 100 without decreasing accuracy in identification. The number of basis functions to be extracted from the data depends upon how many are required to give good classifications of unknown objects without affecting the processing speed (i.e., a large set of basis functions is not desired).

The basis functions and coefficients can be generated using a number of dimension reduction techniques. One method for generating the basis functions and coefficients is to use Fisher's linear discriminant analysis ("LDA"), which finds a low dimensional projection of the data such that in the resulting space, the ratio of between-category variation and within-category variation is the largest. For purposes of clarity, a description of the LDA procedure is presented in Appendix A. In an alternative embodiment of the present method, another approach termed penalized discriminant analysis ("PDA") is utilized for dimension reduction. This approach is particularly useful when the predictor variables are highly correlated. By imposing a smoothness constraint on the discriminant basis coefficients, the PDA technique results in improved prediction performance and interpretability. Again, for purposes of clarity, a description of the method is provided in Appendix B.

The above represents the methodology utilized in constructing the reference library. As shown, the reference library stores one set of basis functions for all of the objects (with different orientations) to be identified, a corresponding set of basis coefficients for each object (with different orientations), and a label for each object (step 345).

Referring still to FIG. 3, the process of how an unknown object is identified is now described. The process of analyzing unknown image data set 350 is similar to that described above for the reference library. In sum, a local radius of curvature is extracted for each selected data point in unknown image data set (steps 355–370). The spectrum of the unknown object is then computed (step 375) and a set of basis coefficients is generated by fitting the same basis functions determined in making the library (step 380).

The unclassified set of basis coefficients is stored (step 385) and compared against the reference library (step 390) using one of several statistical classification techniques. The dimension reduction techniques discussed above are intended to make the job of classifying an unknown spectra more efficient by designing a reduced space in which J categories are separated as much as possible. Two classifying procedures: the nearest neighbor rule and the non-negative least squares methods are discussed below. Other statistical approaches can also be used to classify the unknown spectrum. As explained herein, the present invention optical recognition system may be implemented to recognize any item of commerce from which a local radius of curvature can be measured.

The comparison results are then displayed to the user of the optical recognition system. As stated previously, the display can show a ranked order list of possible matches that have a probability of match greater than a predetermined threshold, for example, greater than 80% probability. A cashier could check that the first listed item is correct and either accept the first choice or indicate the correct choice using a supplied input device. The cashier could also indicate to the system to repeat the identification process. Alternatively, the system could immediately accept the first choice, as in a fully automatic (unmanned) check-out system.

In one embodiment of the present invention, the outcome of the classification process could be combined with spectroscopic methods of characterizing the same objects. The outcome of the comparison analysis can be potentially re-ordered as a result of the color identification process. This could be done on a weighted or non-weighted basis, depending upon the relative accuracy of both the color and shape identification processes.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications which come within the scope of the appended claim is reserved.

Appendix A

Linear Discriminant Analysis

Let d-dimensional vector $(x_{ij})_{d \times 1}$ represent the observation vector of the i-th sample from the j-th class, for $j=1, \ldots, J$ and $i=1, \ldots, n_j$ where J is the number of classes.

When d is large, many statistical procedures become impractical due to the lack of "sufficient" data that represent the population of patterns in high dimensional space. Therefore, it is desirable to reduce the dimensionality of the original data before carrying out classification procedures.

A widely used method of dimension reduction is the Fisher's linear discriminant analysis ("LDA"), which seeks lower dimensional projections that separate different classes the most. In the following, a brief description is given of LDA and the computational procedure. Let $$\bar{x}.. = \frac{1}{n}\sum_{j=1}^{J}\sum_{i=1}^{n_j} x_{ij} \text{ and } \bar{x}_{j.} = \frac{1}{n_j}\sum_{i=1}^{n_j} x_{ji}$$

be the overall mean and the mean of j-th class, where $n=\Sigma_j^{j=1} n_j$. The total sample covariance matrix would be:

$$S_{T(d \times d)} = \frac{1}{n}\sum_{j=1}^{J}\sum_{i=1}^{n_j}(\bar{x}_{ji} - \bar{x}..)(\bar{x}_{ji} - \bar{x}..)^T$$

and can be decomposed into between-class sample covariance and within-class sample covariance as follows:

$$S_{T(d \times d)} = S_{B(d \times d)} + S_{W(d \times d)}$$

$$\frac{1}{n}\sum_{j=1}^{J} n_j(\bar{x}_{j.} - \bar{x}..)(\bar{x}_{j.} - \bar{x}..)^T + \frac{1}{n}\sum_{j=1}^{J}\sum_{i=1}^{n_j}(x_{ji} - \bar{x}_{j.})(x_{ji} - \bar{x}_{j.})^T$$

Suppose that we want to find projections of the original d-dimensional data x to p-dimensional space, (p is usually much smaller than d), we use $$(y_{ij})_{p \times 1} = F_f^{p \times d}(x_{ij d \times 1})$$

then, the between-class sample covariance and within-class covariance of y are:

$$S_{B(p \times p)}^y = \frac{1}{n}\sum_{j=1}^{J} n_j(\bar{y}_{j.} - \bar{y}..)(\bar{y}_{j.} - \bar{y}..)^T$$

$$S_{B(p \times p)}^y = \frac{1}{n}\sum_{j=1}^{J} n_j(F^T\bar{x}_{j.} - F^T\bar{x}..)(F^T\bar{x}_{j.} - F^T\bar{x}..)^T$$

-continued $$S^y_{B(p \times p)} = F^T S_B F$$

$$S^y_{W(p \times p)} = \frac{1}{n}\sum_{j=1}^{J}\sum_{i=1}^{n_j}(F^T x_{ji} - F^T \bar{x}_{j.})(F^T x_{ji} - F^T \bar{x}_{j.})^T = F^T S_W F$$

The criterion used to derive the optimal projection matrix is to find F that maximizes the trace of the between-class variance $$S_B{}^y = tr(F^T S_B F)$$

under a constraint on the within-class variance $$S_W{}^y = F^T S_W F = I_{p \times p}$$

The trace of a matrix is defined as the sum of all diagonal elements of that matrix.

The solution to this maximization problem is simply a set of generalized eigenvectors, which can be obtained as follows. If we let $$\Theta = S_W^{\frac{1}{2}} F$$

then the original constrained maximization problem is equivalent to maximizing $$tr\left(\Theta S_W^{-\frac{1}{2}} S_B S_W^{-\frac{1}{2}} \Theta^T\right)$$

subject to $$\Theta^T \Theta = I_{p \times p}$$

which leads to the solution $$\hat{F} = S_W^{-\frac{1}{2}} \hat{\Theta}$$

where $\hat{\Theta}$ is the matrix of leading p eigenvectors of $$S_W^{-\frac{1}{2}} S_B S_W^{-\frac{1}{2}}$$

Or, equivalently, $\hat{F}$ is the matrix of leading p eigenvectors of $S_W^{-1} S_B$.

Appendix B
Penalized Discriminant Analysis

In the case where the predictor variables are more alike than the ones far apart, it is desirable to have similar coefficients for neighboring predictor variables. In other words, the coefficients should change smoothly across the predictor variables. Hastie, Buja and Tibshirani (1992) have developed a new method called penalized discriminant analysis ("PDA") that allows a smoothness constraint on the discriminant coefficients, both for improved prediction performance and interpretability. The new method is an extension of the traditional LDA by introducing smoothness to the discriminant coefficients.

The PDA projections are obtained as the F matrix that maximizes the between-class variance $$S_B{}^Y = tr(FS_B F^T)$$

under a constraint on the penalized within-class variance of $$S_W{}^y(\Omega) = F(S_W + \lambda\Omega)F^T = I_{p \times p}$$

where $\Omega$ is a d×d penalty matrix and $\lambda$ is a scalar that adjusts the degrees of smoothness of the linear discriminant coefficients. As an example, $\Omega$ can be chosen such that $\beta^T \Omega \beta$ represents the "integrated" absolute value of the second order derivatives of the function representing the LDA coefficient $\beta$, where $\beta$ can be any one column of F. The goal is to keep this term relatively small if we want the coefficients to be smooth.

What is claimed is:

1. A method for use by a computer for recognizing an object from a reference library of known objects based on a spectrum of local radius of curvature of said object, said method comprising the steps of:

illuminating a surface portion of said object with a pattern of light, wherein said pattern of light is selected from the group consisting of a grid pattern and a pattern of "X"s;

capturing an image data set of said surface portion at an angular offset with respect to a source of said pattern of light, wherein said pattern of light and offset image capture permit extraction of three dimensional coordinates for data points in said image data set;

extracting three dimensional coordinates for at least one data point in said image data set;

determining a spectrum of local radii of curvatures for said at least one selected data point in said image data set;

constructing said reference library of known objects by repeating said steps of capturing, extracting and determining with different objects; and comparing an unknown spectrum of local radius of curvature against said reference library of known objects to make an identification.

2. The method according to claim 1, wherein said source illuminates said object with a series of parallel planes of light.

3. The method according to claim 1, wherein said step of determining computes said spectrum of local radii of curvatures over varying lengths of data points in said image data set.

4. The method according to claim 1, wherein said step of constructing includes repeating said steps of applying, capturing and determining with different orientations of each of said different objects.

5. The method according to claim 1, wherein said step of determining includes the steps of:

extracting a mean local radius of curvature for said object; and extracting a Gaussian local radius of curvature for said object.

6. The method according to claim 1, wherein said step of determining includes the steps of:

identifying a neighborhood of data points for said at least one selected data point;

rotating said neighborhood of data points such that an outward normal to said surface portion of said object at said at least one selected point is aligned vertically;

fitting a local weighted least square polynomial to said neighborhood of data points; and calculating at least one measure of local radius of curvature for said at least one selected data point.

7. The method according to claim 6, wherein said step of determining further includes the steps of:
repeating said steps of identifying, rotating, fitting and calculating for each additional selected data point; and
compiling histograms of all measures of local radii of curvatures to form a spectrum representing a distribution of said at least one measure of local radius of curvature.

8. The method according to claim 1, wherein a size of said surface portion is selectable from a range of sizes dependent upon an actual size of said object.

9. The method according to claim 1, wherein a size of said surface portion is relative to an actual size of said object.

10. The method according to claim 1, wherein said step of constructing further includes the step of generating a given set of basis functions for all of said different objects and a corresponding set of basis coefficients for each of said different objects when constructing said reference library of known objects.

11. The method according to claim 10, wherein the step of comparing includes the steps of:
generating a given set of basis coefficients for said object when utilizing said reference library of known objects to identify said object; and
classifying said given set of basis coefficients against said reference library of known objects to identify said corresponding set of basis coefficients most closely matching said given set of basis coefficients.

12. The method according to claim 11, wherein linear discriminant analysis is used to generate said given set of basis functions, said corresponding set of basis coefficients and said given set of basis coefficients.

13. The method according to claim 11, wherein said step of classifying is achieved using a non-negative least squares technique.

14. The method according to claim 11, wherein said step of classifying is achieved using a nearest neighbor technique.

15. The method according to claim 11, wherein penalized discriminant analysis is used to generate said given set of basis functions, said corresponding set of basis coefficients and said given set of basis coefficients.

16. The method according to claim 1, wherein said step of comparing includes the steps of:
generating a ranked order list of object choices;
displaying said ranked order list on a display interface unit; and
selecting one of said object choices on said ranked order list.

17. The method according to claim 16, wherein said step of selecting is automatic.

18. The method according to claim 16, wherein said step of selecting is manual.

19. The method of claim 1, further including the steps of:
characterizing said object using spectroscopic analysis; and
statistically combining said spectroscopic analysis with said step of comparing to produce a ranked order list of most closely matched product choices.

20. An optical recognition system for recognizing an object from a reference library of known objects based on a spectrum of local radius of curvature of said object, said system comprising:
a source for illuminating a surface portion of said object with a pattern of light, wherein said pattern of light is a grid;
an imaging device that is positioned at an angular offset with respect to said source for capturing an image data set of said surface portion, wherein said pattern of light and said imaging device permit the extraction of three dimensional coordinates for data points in said image data set;
a processor for extracting three dimensional coordinates and for determining a spectrum of local radii of curvatures for at least one selected data point in said image data set;
said processor being further operable to construct said reference library of known objects by capturing image data sets of different objects; and
said processor being further operable to compare an unknown spectrum of local radius of curvature against said reference library of known objects to make an identification.

21. The system according to claim 20, wherein said source illuminates said object with a series of parallel planes of light.

22. The system according to claim 20, wherein said processor computes said spectrum of local radii of curvatures over varying lengths of data points in said image data set.

23. The system according to claim 20, wherein said processor constructs said reference library with different orientations of each of said different objects.

24. The system according to claim 20, wherein:
said processor is further operable to identify a neighborhood of data points for said at least one selected data point;
said processor is further operable to rotate said neighborhood of data points such that an outward normal to said surface portion of said object at said at least one selected data point is aligned vertically;
said processor is further operable to fit a local weighted least square polynomial to said neighborhood of data points; and
said processor is further operable to calculate at least one measure of local radius of curvature for said at least one selected data point.

25. The system according to claim 24, wherein said at least one measure of curvature includes a mean local radius of curvature for said object and a Gaussian local radius of curvature for said object and wherein said processor is further operable to compile histograms of all measures of local radii of curvatures to form a spectrum representing a distribution of said at least one measure of local radius of curvature.

26. The system according to claim 20, wherein said source can illuminate varying sizes of said surface portion of said object.

27. The system according to claim 20, wherein:
said processor is further operable to generate a given set of basis functions for all of said different objects and a corresponding set of basis coefficients for each of said different objects when constructing said reference library of known objects;
said processor is further operable to generate a given set of basis coefficients for said object when utilizing said reference library of known objects to identify said object; and
said processor is further operable to classify said given set of basis coefficients against said reference library of known objects to identify said corresponding set of basis coefficients most closely matching said given set of basis coefficients.

28. The system according to claim 27, wherein said processor utilizes linear discriminant analysis to generate said given set of basis functions, said corresponding set of basis coefficients and said given set of basis coefficients and wherein said processor uses non-negative least squares analysis to classify said object.

29. The system according to claim 27, wherein said processor utilizes penalized discriminant analysis to generate said given set of basis functions, said corresponding set of basis coefficients and said given set of basis coefficients and wherein said processor uses nearest neighbor analysis to classify said object.

30. The system according to claim 20, further including a display for displaying a ranked order list of object choices and said display having means for selecting one of said object choices on said ranked order list.

31. The system of claim 20 wherein said illuminating source is a bar-code reader.

* * * * *